(12) United States Patent
Sako et al.

(10) Patent No.: US 9,307,617 B2
(45) Date of Patent: Apr. 5, 2016

(54) ILLUMINATION APPARATUS AND STORAGE MEDIUM

(71) Applicant: SONY CORPORATION, Tokyo (JP)

(72) Inventors: Yoichiro Sako, Tokyo (JP); Kazuhiro Watanabe, Tokyo (JP); Kazuyuki Sakoda, Chiba (JP); Hiroshi Okada, Kanagawa (JP); Hirofumi Yuchi, Kanagawa (JP); Kohei Asada, Kanagawa (JP); Takashi Sato, Tokyo (JP); Yutaka Fukuyama, Kanagawa (JP); Kiyoshi Yoneda, Tokyo (JP); Kouji Miyata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 323 days.

(21) Appl. No.: 13/970,917

(22) Filed: Aug. 20, 2013

(65) Prior Publication Data

US 2014/0070729 A1 Mar. 13, 2014

(30) Foreign Application Priority Data

Sep. 7, 2012 (JP) ................. 2012-197159

(51) Int. Cl.
*G05F 1/00* (2006.01)
*H05B 37/02* (2006.01)
*H05B 39/04* (2006.01)
*H05B 41/36* (2006.01)

(52) U.S. Cl.
CPC ........ *H05B 37/0236* (2013.01); *H05B 37/0245* (2013.01)

(58) Field of Classification Search
USPC ................. 315/131, 152–154, 169.3, 297
See application file for complete search history.

(56) References Cited

U.S. PATENT DOCUMENTS

| | | | |
|---|---|---|---|
| 7,109,986 B2 * | 9/2006 | Kerr ................... | G06Q 50/24 345/418 |
| 2009/0096993 A1 * | 4/2009 | Velazquez ............ | G09F 19/18 353/25 |
| 2012/0217882 A1 * | 8/2012 | Wong .................. | F21S 4/008 315/185 R |
| 2013/0293396 A1 * | 11/2013 | Selevan ............... | G08G 9/00 340/907 |
| 2013/0301235 A1 * | 11/2013 | Harooni ............... | G03B 15/02 362/11 |
| 2014/0070729 A1 * | 3/2014 | Sako ................... | H05B 37/0236 315/307 |
| 2014/0186048 A1 * | 7/2014 | Oshima ............... | H04B 10/541 398/118 |
| 2014/0334648 A1 * | 11/2014 | Wang .................. | H05B 37/0272 381/150 |
| 2014/0335910 A1 * | 11/2014 | Wang .................. | H05B 37/0272 455/550.1 |
| 2015/0081042 A1 * | 3/2015 | Dayrell ............... | G05B 15/02 700/17 |
| 2015/0102731 A1 * | 4/2015 | Altamura ............. | F21S 4/001 315/152 |
| 2015/0167956 A1 * | 6/2015 | Vaidya ................ | F21V 14/02 381/92 |
| 2015/0209666 A1 * | 7/2015 | Harris ................. | A63F 13/27 463/31 |
| 2015/0321090 A1 * | 11/2015 | Schlossberg ......... | A63F 13/235 463/31 |
| 2015/0321095 A1 * | 11/2015 | Schlossberg ......... | A63F 13/27 463/31 |

FOREIGN PATENT DOCUMENTS

| | | |
|---|---|---|
| JP | 2008-035133 A | 2/2008 |
| JP | 2009-141924 A | 6/2009 |
| JP | 2010-508626 A | 3/2010 |

* cited by examiner

*Primary Examiner* — Adam Houston
(74) *Attorney, Agent, or Firm* — Hazuki International, LLC (57) ABSTRACT

There is provided an illumination apparatus including an illumination unit, a reception unit, and a control unit configured to control illumination of the illumination unit in accordance with a default illumination pattern. When the reception unit receives an illumination pattern, the control unit performs illumination control different from the illumination according to the default illumination pattern.

17 Claims, 9 Drawing Sheets

| ATTRIBUTE OF SENDER | ILLUMINATION PATTERN (LUMINOUS INTENSITY, COLORS, ON/OFF) |
|---|---|
| SINGLE | ILLUMINATION PATTERN 1 |
| COUPLE | ILLUMINATION PATTERN 2 |
| MEN | ILLUMINATION PATTERN 3 |
| WOMEN | ILLUMINATION PATTERN 4 |
| FAMILY | ILLUMINATION PATTERN 5 |
| ANOTHER GROUP | ILLUMINATION PATTERN 6 |

ILLUMINATION APPARATUS AND STORAGE MEDIUM

BACKGROUND

The present disclosure relates to an illumination apparatus and a storage medium.

Generally speaking, restaurants, bars, concert halls, or the like have a plurality of illumination apparatuses disposed therein, and control illumination of the illumination apparatuses to be synchronized with each other, thereby making the entire space harmonious. For example, illumination control is performed such that colors of illumination in the entire space change with elapse of time, and the illumination is switched on and off.

In addition to control with elapse of time, control is sometimes performed in accordance with music that is played back in the space as illumination control. For example, JP 2010-508626T discloses a technique regarding ambient illumination according to audio signals. Specifically, JP 2010-508626T discloses illumination control that allows illumination to be temporally controlled in accordance with a change recognizable in tracks, and is applicable to theaters, cinemas, discos, bars, restaurants, and home systems.

JP 2008-35133A also discloses a speaker that is preferable for playing back digital content transmitted from a digital media server in accordance with an environment of a user, and a technique for integrally disposing the speaker with an illumination apparatus for providing a sound environment according to luminous intensity of the illumination. Specifically, the speaker device described in JP 2008-35133A is controlled to lower a volume when a listener darkens the illumination below some level in order to sleep.

JP 2009-141924A further discloses an illumination apparatus that provides speaker functions to shades and globes of various illumination apparatuses (such as desk lamps and floor lamps), which are provided in buildings in most cases. A special space and installation are not hereby necessary for the speaker so that a user can freely play back music.

SUMMARY

However, none of JP 2010-508626T, JP 2008-35133A, and JP 2009-141924A discloses that control is switched to individual illumination control for each visitor when illumination control is performed over the entire space in, for example, a restaurant or a bar. If illumination control is individually switched for each visitor, the visitors can be hereby more satisfied with entertainment of the illumination.

The present disclosure therefore supposes an illumination apparatus and a storage medium that are novel and improved, and can switch illumination control in accordance with reception of an illumination pattern.

According to an embodiment of the present disclosure, there is provided an illumination apparatus including an illumination unit, a reception unit, and a control unit configured to control illumination of the illumination unit in accordance with a default illumination pattern. When the reception unit receives an illumination pattern, the control unit performs illumination control different from the illumination according to the default illumination pattern.

According to another embodiment of the present disclosure, there is provided a non-transitory computer-readable storage medium having a program stored thereon, the program causing a computer to execute a process of controlling illumination of an illumination unit in accordance with a default illumination pattern, a process of receiving, by a reception unit, an illumination pattern, and a process of performing illumination control different from the illumination according to the default illumination pattern when the reception unit receives the illumination pattern.

As described above, according to embodiments of the present disclosure, it becomes possible to switch illumination control in accordance with reception of an illumination pattern.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in order described below:
1. Overview of Control System According to Embodiment of Present Disclosure
2. Each Embodiment
2-1. First Embodiment
2-2. Second Embodiment
2-3. Third Embodiment
2-4. Fourth Embodiment
3. Conclusion

1. OVERVIEW OF CONTROL SYSTEM ACCORDING TO EMBODIMENT OF PRESENT DISCLOSURE

First, with reference to FIG. 1, an overview of a control system according to an embodiment of the present disclosure will be described.

Figure 1:
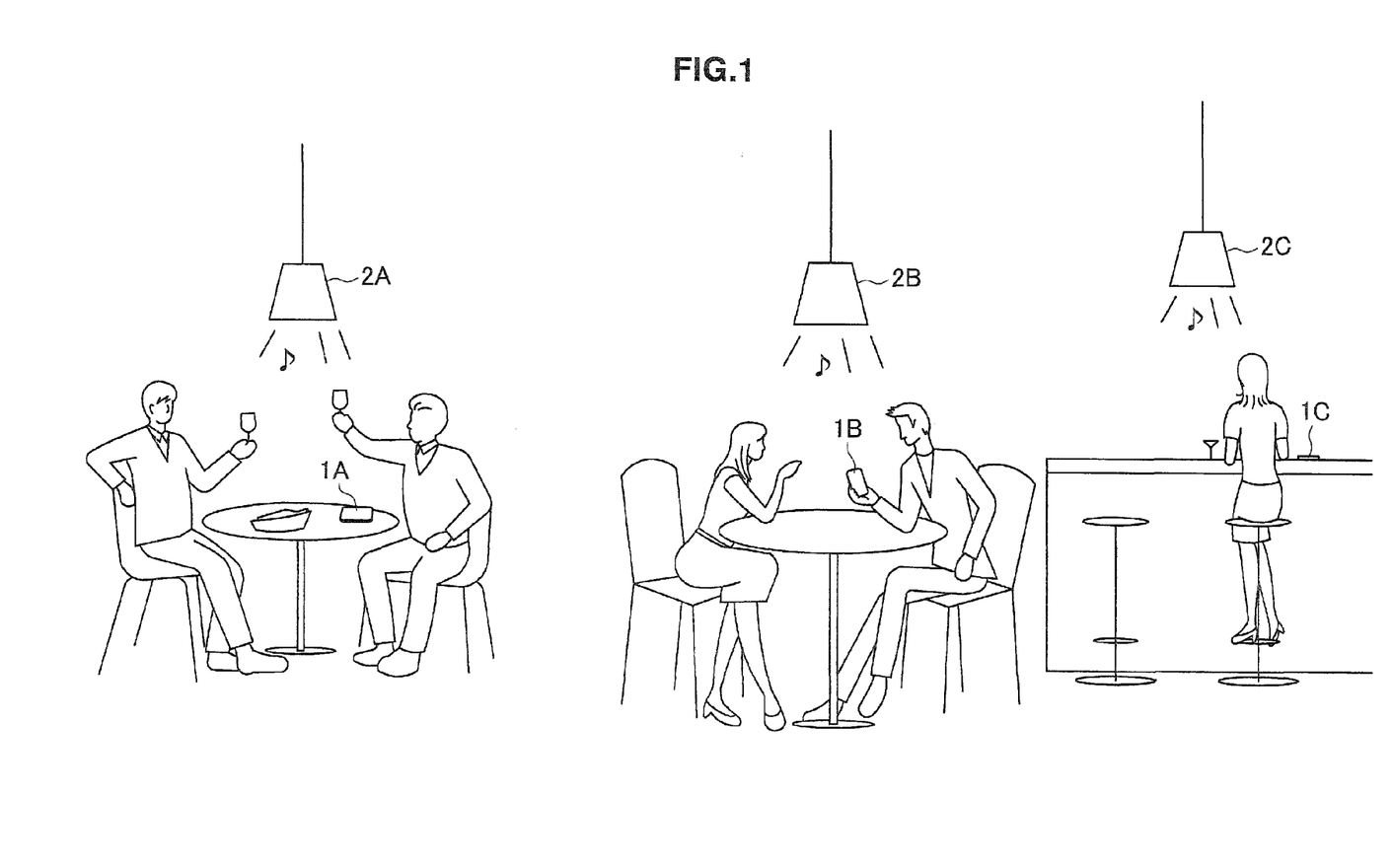
FIG. 1 is a diagram for describing an overview of a control system according to an embodiment of the present disclosure.

FIG. 1 is a diagram for describing the overview of the control system according to the embodiment of the present disclosure. As illustrated in FIG. 1, pendant lights 2A, 2B, and 2C according to the present embodiment are each disposed at a table in order to illuminate visitors at the table in, for example, a restaurant, a bar, a lounge, a coffee shop, and a club.

A plurality of illumination apparatuses disposed in public places such as restaurants is generally all controlled by the shops. The shops control illumination of the plurality of illumination apparatuses to be synchronized with each other, thereby making the entire space harmonious. A plurality of speakers in public places such as restaurants is also generally all controlled by the shops so that the same music and the same announcement are output from the plurality of speakers.

However, it is possible that visitors in shops such as restaurants would like illumination of the visitors' preference, and would like to listen to music of the visitors' preference as BGM.

In view of such circumstances, there is provided a control system (illumination apparatus) according to each embodiment of the present disclosure. The control system according to each embodiment of the present disclosure can switch illumination control in accordance with reception of an illumination pattern. The present control system can hereby satisfy visitors more with entertainment of the illumination.

Specifically, first, the pendant lights 2A to 2C, which have illumination apparatuses according to the present embodiment mounted thereon, perform default illumination control that has been set by the shops in advance. When the pendant lights 2A to 2C receive illumination patterns from communication terminals 1A to 1C (such as mobile phones, smart phones, and tablet terminals) held by the users at the tables, respectively, the default illumination control is switched to different illumination control. More specifically, for example, the pendant lights 2A to 2C may perform illumination control according to the received illumination patterns.

The illumination patterns received from the communication terminals may be content information such as audio signals (including music data), image data (moving images), video data, and sounds of the users.

Each of the pendant lights 2A to 2C may also include a speaker, and may play back the audio signals, which have been received as an illumination pattern, from the speaker.

The user can hereby switch the illumination at the table in the shop, and switch the BGM that the user can hear at the table to the music of preference of the user.

As explained above, the overview of the control system according to the embodiment of the present disclosure has been described. Next, a plurality of embodiments will be mentioned to describe the control system according to the present embodiment in detail.

2. EACH EMBODIMENT

2-1. First Embodiment

It will be specifically described that illumination apparatuses independently perform illumination control in a control system according to a first embodiment.

(2-1-1. Configuration)

Figure 2:
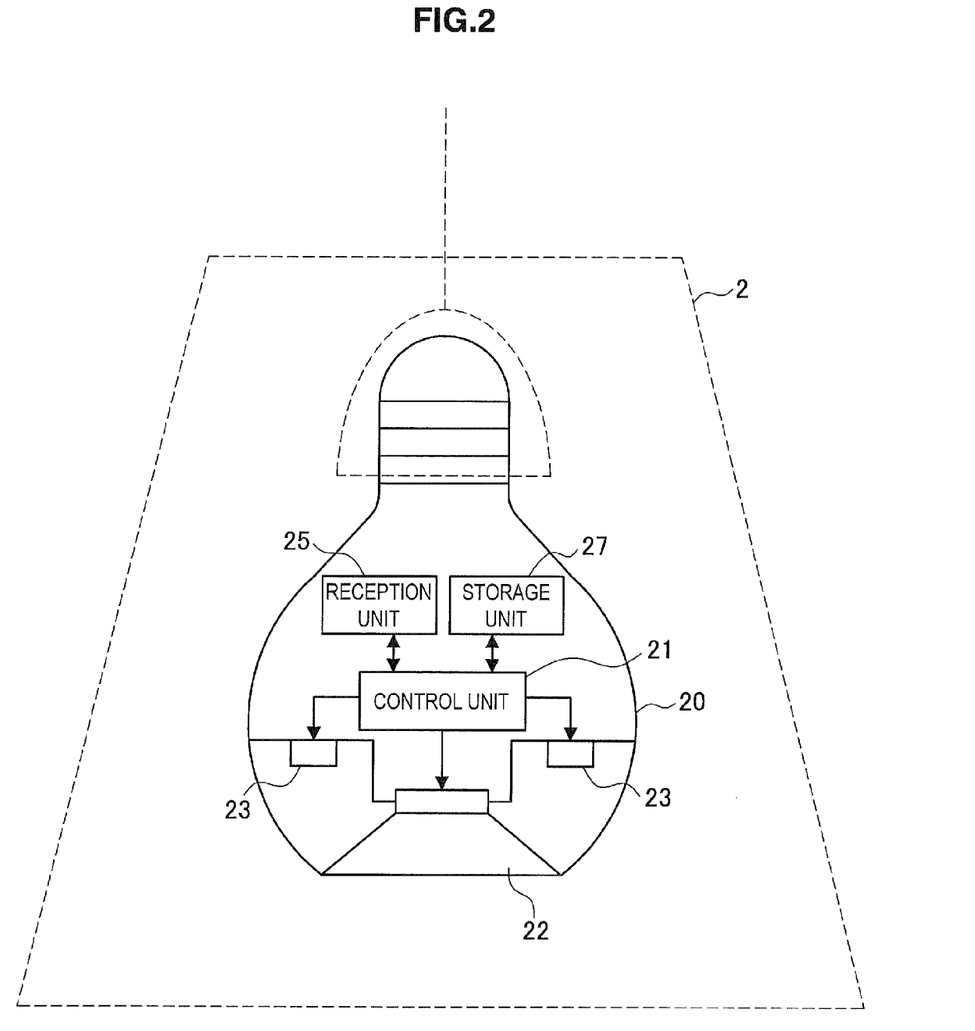
FIG. 2 is a block diagram for describing a configuration of an illumination apparatus according to a first embodiment.

FIG. 2 is a block diagram for describing a configuration of an illumination apparatus according to the present embodiment. As illustrated in FIG. 2, an illumination apparatus 20 according to the present embodiment is a light bulb having a speaker built therein, and is used for various lamps such as a stand light and a table lamp in addition to the pendant light 2. In this way, if a playback device (speaker) is built in an illumination apparatus, which is provided indoors in most cases, no additional space is necessary for the playback device. Consequently, the space can be effectively used.

Furthermore, as illustrated in FIG. 2, the illumination apparatus 20 according to the present embodiment includes a control unit 21, a speaker 22, an illumination unit 23, a reception unit 25, and a storage unit 27.

(Storage Unit)

The storage unit 27 stores a default illumination pattern and default audio signals. Such a default illumination pattern and default audio signals are set in advance by a person who has installed the illumination apparatus 20. The storage unit 27 may be flash memory such as card memory, and may be detachably disposed in the illumination apparatus 20.

(Reception Unit)

The reception unit 25 has a function of receiving data from the outside. The reception unit 25 according to the present embodiment also receives an illumination pattern from the communication terminal 1 held by a user. Specifically, the reception unit 25 may, for example, receive the illumination pattern from the communication terminal 1 at a spatially nearby position through near field communication such as a wireless LAN, Bluetooth (registered trademark), Wi-Fi, and infrared communications.

(Speaker)

The speaker 22 is an audio playback unit having a function of outputting (playing back) audio signals. The speaker 22 according to the present embodiment may play back the audio signals received by the reception unit 25 as an illumination pattern from the communication terminal 1, in accordance with control of the control unit 21. The speaker 22 according to the present embodiment may be a super-directional speaker that uses ultrasound. In this case, the speaker 22 can play back audio signals, for example, such that the audio signals are heard only around a table at which a user sits who has transmitted the audio signals. Users at tables each transmit audio signals of preference to the illumination apparatus 20. Even if a plurality of the illumination apparatuses 20 plays back different audio signals, the audio signals can be hereby prevented from being mixed to noises.

(Illumination Unit)

The illumination unit 23 has a function of emitting light in accordance with control of the control unit 21. For example, the illumination unit 23 according to the present embodiment is realized as a Light Emitting Diode (LED) lamp, an incandescent lamp, or a High Intensity Discharge (HID) lamp. In the example illustrated in FIG. 2, a plurality of the illumination units 23 according to the present embodiment is disposed around the speaker 22.

(Control Unit)

The control unit 21 has a function of controlling each configuration of the illumination apparatus 20. Specifically, the control unit 21 according to the present embodiment, first, performs control (illumination control) on luminous intensity, colors, switching on and off of the illumination unit 23, for example, in accordance with the default illumination pattern stored in the storage unit 27. The control unit 21 performs control such that the default audio signals stored in the storage unit 27 are played back from the speaker 22. Additionally, the control unit 21 may treat audio signals received from a predetermined antenna as the default audio signals. In addition to the default illumination pattern stored in the storage unit 27, a pattern in which a lamp is just kept lighting may be adopted as the default illumination pattern.

Synchronized with illumination control and playback control performed by another illumination apparatus disposed in the vicinity, the control unit 21 realizes illumination according to the default illumination pattern and plays back the default audio signals. Specifically, the respective control units 21 may perform illumination control and playback control in the plurality of illumination apparatuses in accordance with predetermined timers, thereby realizing synchronization control. Alternatively, the plurality of illumination apparatuses may communicate with each other, thereby realizing synchronization control. The control unit 21 may also perform synchronization control in accordance with synchronization signals from a control apparatus that manages a plurality of illumination apparatuses.

For example, the illumination pattern may be realized as shown in the following table 1 or 2. The control unit 21 controls illumination of the illumination unit 23 in accordance with the following illumination pattern.

| Time | ON/OFF |
|------|--------|
| 0:00 | ON |
| 0:05 | OFF |
| 0:10 | ON |

| Time | ON/OFF | Level of Luminous Intensity |
|------|--------|------------------------------|
| 0:00 | ON | 5 |
| 0:05 | OFF | |
| 0:06 | ON | 1 |
| 0:07 | ON | 2 |
| 0:08 | ON | 3 |
| 0:09 | ON | 4 |

When the reception unit 25 receives an illumination pattern from the communication terminal 1 of a user, the control unit 21 performs illumination control different from the default illumination control. Specifically, the control unit 21 may control colors, luminous intensity, and switching on and off of illumination, for example. For example, if all the illumination apparatuses are emitting white light as the default illumination control, a user can transmit an illumination pattern from the communication terminal 1 to switch only illumination apparatuses at a table of the user so as to emit colorful light such as blue, pink, red, and yellow light.

The control unit 21 may further perform illumination control in accordance with the received illumination pattern. For example, when audio signals are received as an illumination pattern, the audio signals may be played back from the speaker 22, colors and luminous intensity, and switching on and off of illumination may be controlled in accordance with melody and rhythm of the audio signals. The audio signals can be hereby aurally and visually expressed. Consequently, high quality entertainment can be provided with music and light integrated with each other.

As explained above, the specific configuration of the illumination apparatus 20 according to the present embodiment has been described in detail. Next, with reference to FIG. 3, an operational process of the illumination apparatus 20 according to the present embodiment will be described.

(2-1-2. Operational Process)

Figure 3:
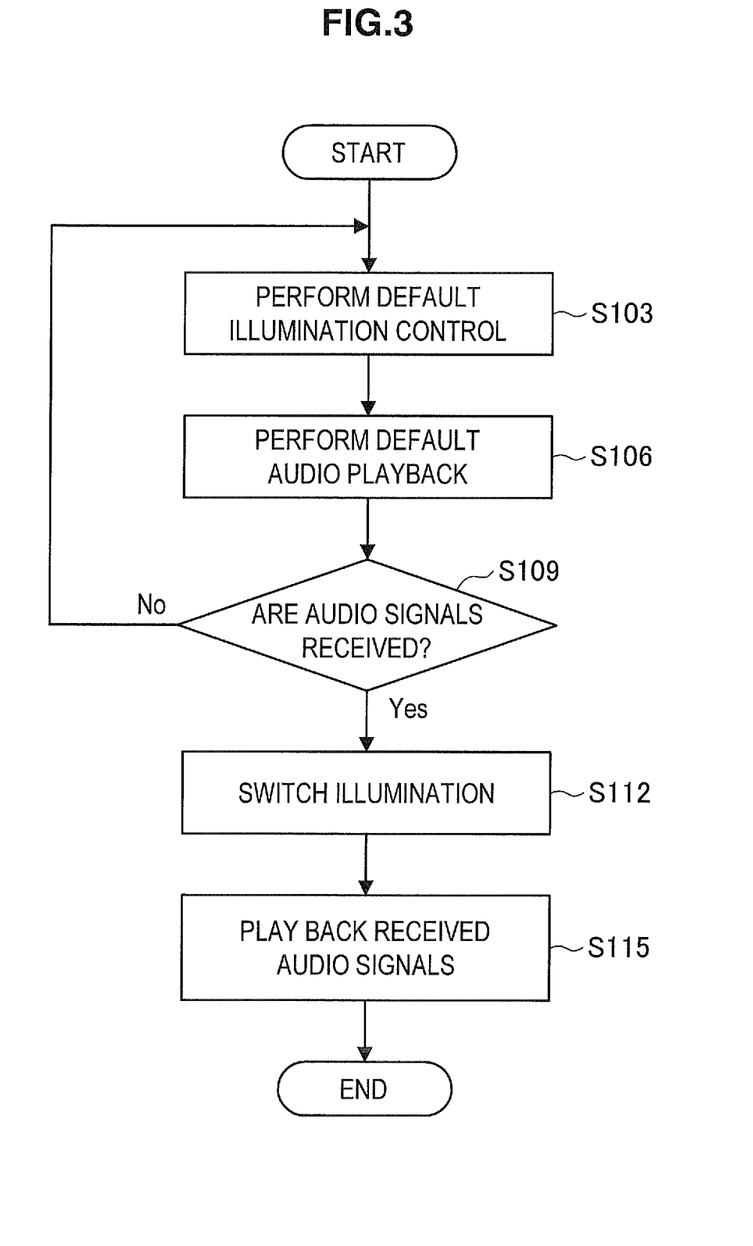
FIG. 3 is a flowchart illustrating an operational process of the illumination apparatus according to the first embodiment.

FIG. 3 is a flowchart illustrating the operational process of the illumination apparatus 20 according to the present embodiment. As illustrated in FIG. 3, first, in step S103, the control unit 21 of the illumination apparatus 20 controls illumination of the illumination unit 23 in accordance with the default illumination pattern stored in the storage unit 27.

Next, in step S106, the control unit 21 performs control such that the default audio signals stored in the storage unit 27 are played back from the speaker 22. Additionally, step S103 and step S106 may be processed in parallel.

Next, in step S109, the control unit 21 determines whether the reception unit 25 has received audio signals from the communication terminal 1 of a user as an illumination pattern.

Next, if the audio signals have been received (S109/Yes), the illumination unit 23 is, in step S112, switched by the control unit 21 so as to have illumination different from the default illumination. Specifically, as described above, the control unit 21 controls luminous intensity, colors, and switching on and off of illumination to be each different from the default. The control unit 21 may also control illumination (including luminous intensity, colors, and switching on and off) of the illumination unit 23 in accordance with melody and rhythm of the received audio signals.

Next, in step S115, the control unit 21 performs control such that the audio signals which have been received by the reception unit 25 from the communication terminal 1 of the user are played back from the speaker 22. Additionally, step S112 and step S115 may be processed in parallel.

As explained above, the first embodiment has been described in detail. In the first embodiment, if receiving an illumination pattern from the communication terminal 1 of a user, the illumination apparatus 20 according to the present embodiment switches the default illumination, which is synchronized with another illumination apparatus, and has illumination different from the default illumination. A special illumination service can be hereby provided to the user.

The illumination apparatus 20 according to the present embodiment also has the speaker 22 built therein. The illumination apparatus 20 can therefore construe the audio signals received from the communication terminal 1 as an illumination pattern, can have illumination in accordance with the audio signals, and can play back the audio signals from the speaker 22, thereby providing a service with light and sounds combined with each other.

2-2. Second Embodiment

In the first embodiment described above, it has been described, as an example of control on illumination different from the default illumination, that the control unit 21 performs illumination control in accordance with melody and rhythm of audio signals. However, control on illumination different from the default illumination, which is performed by the control unit 21 according to the embodiment of the present disclosure, is not limited to the illumination control described in the first embodiment. For example, the control unit 21 may perform illumination control in accordance with an attribute of a sender who transmits audio signals. An illumination apparatus 20' will be described below that performs illumination control in accordance with the attribute of the sender in this way.

(2-2-1. Configuration)

Figure 4:
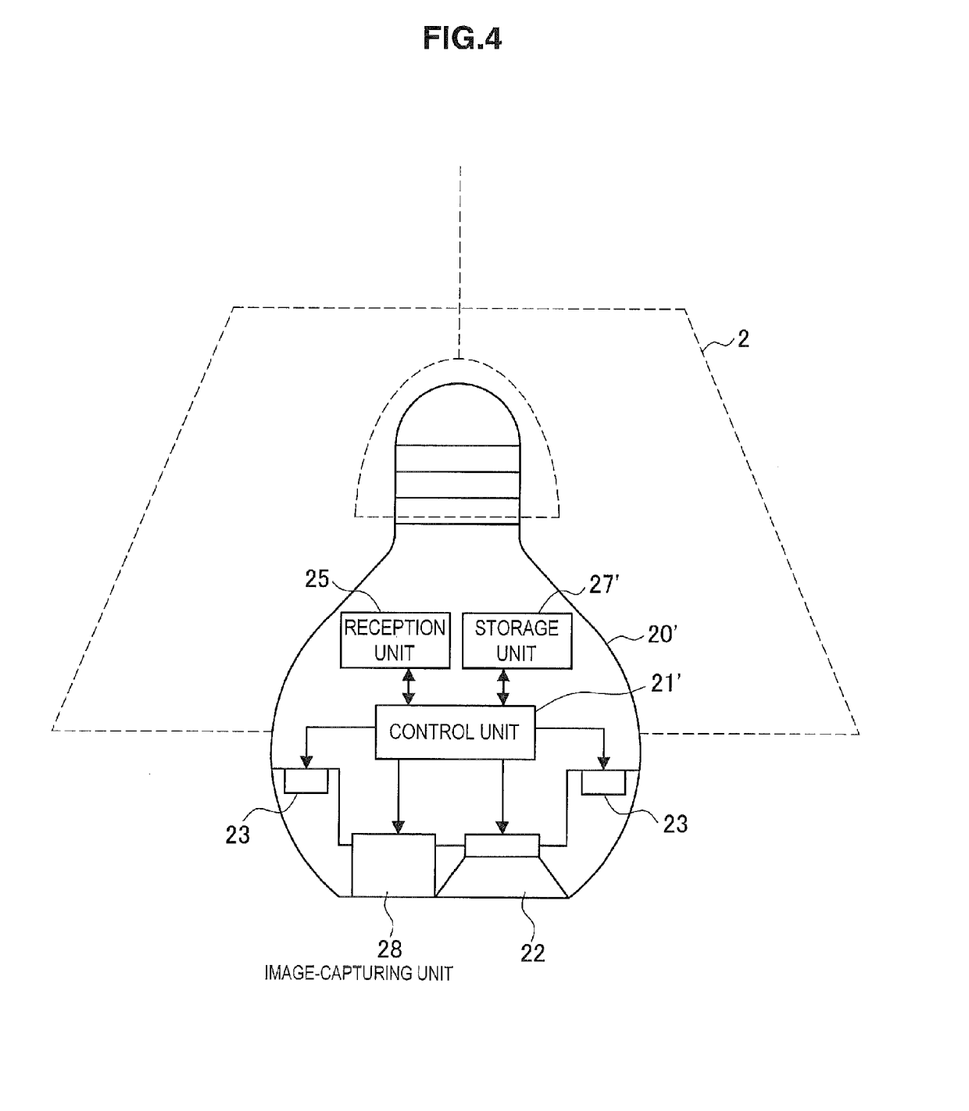
FIG. 4 is a block diagram for describing a configuration of an illumination apparatus according to a second embodiment.

FIG. 4 is a block diagram for describing a configuration of the illumination apparatus 20' according to a second embodiment. As illustrated in FIG. 4, the illumination apparatus 20' according to the present embodiment includes a control unit 21', a speaker 22, an illumination unit 23, a reception unit 25, a storage unit 27', and an image-capturing unit 28. The speaker 22, the illumination unit 23, and the reception unit 25 are configured in the same way as the speaker 22, the illumination unit 23, and the reception unit 25 of the illumination apparatus 20 according to the first embodiment described with reference to FIG. 2, respectively. The description will be therefore omitted here.

(Storage Unit)

The storage unit 27' stores a default illumination pattern and default audio signals in the same way as the above-described storage unit 27. The storage unit 27' according to the present embodiment further stores an attribute table in which an attribute of a sender is associated with a content of illumination control. Here, with reference to FIG. 5, an example of the attribute table according to the present embodiment will be described.

Figure 5:
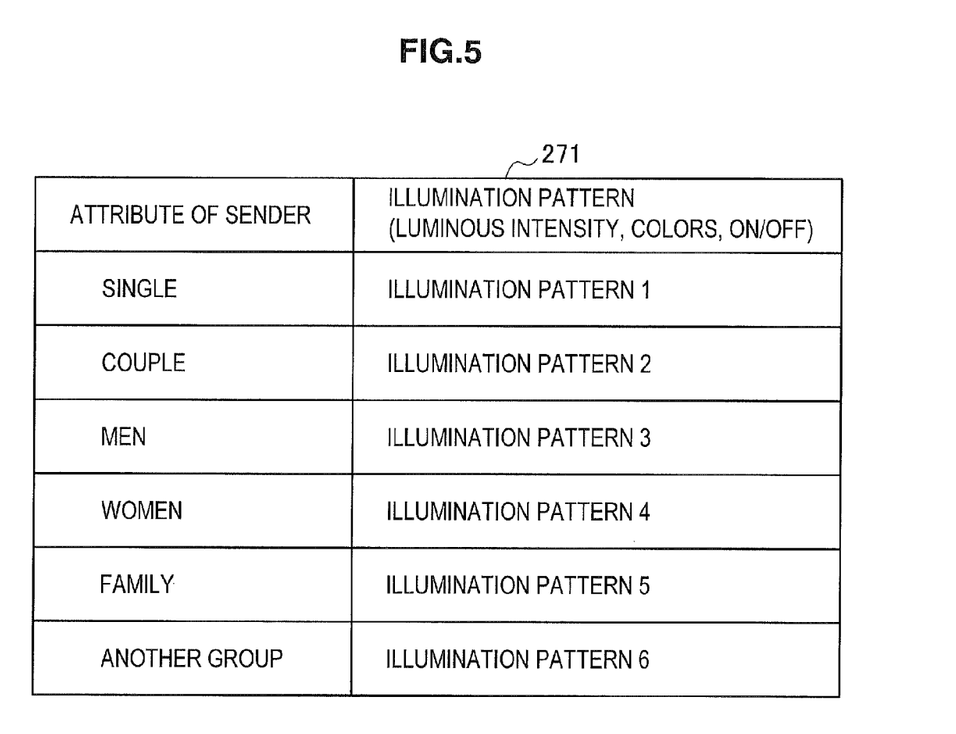
FIG. 5 is a diagram for describing an example of an attribute table according to the second embodiment.

FIG. 5 is a diagram for describing an example of an attribute table 271 according to the second embodiment. As illustrated in FIG. 5, the attribute table 271 is a table in which an attribute of a sender is associated with an illumination pattern. For example, if a single sender sits, the sender is assigned "single"; and if a group including a sender sits, the sender is assigned "couple," "men," "women," "family," or "another group (such as a plurality of men and women)" in accordance with members of the group, as the attribute of the sender.

As illustrated in FIG. 5, the attributes are each associated with a different illumination pattern. The illumination pattern is a pattern used for controlling luminous intensity, colors, and switching on and off of illumination, for example. For example, if the attribute is "single," an illumination pattern 1 is associated in which luminous intensity is lower than the luminous intensity of the default illumination and a color of the illumination is switched to orange. If the attribute is "couple," an illumination pattern 2 is associated in which a color of the illumination is switched to pink and heart designs are projected. If the attribute is "men," an illumination pattern 3 is associated in which luminous intensity of the illumination is higher than the luminous intensity of the default illumination and a color of the illumination is switched to blue. In this way, illumination patterns are associated in the attribute table 271 for producing an atmosphere according to the attribute of the sender.

(Image-Capturing Unit 28)

The image-capturing unit 28 includes an imaging optical system that includes an image sensor and an imaging lens, and a captured image signal processor, and outputs data of a captured image in the form of digital signals. For example, the image sensor is realized as a Charge Coupled Device (CCD) imager and a Complementary Metal Oxide Semiconductor (CMOS) imager. The image-capturing unit 28 according to the present embodiment can capture a visitor who sits at a table illuminated by the illumination apparatus 20'.

(Control Unit)

The control unit 21' has a function of controlling each configuration of the illumination apparatus 20'. Specifically, in the same way as the above-described control unit 21, the control unit 21' according to the present embodiment, first, controls illumination of the illumination unit 23 in accordance with the default illumination pattern stored in the storage unit 27, and performs playback control such that the default audio signals are played back from the speaker 22.

When the reception unit 25 receives an illumination pattern from the communication terminal 1 of a user, the control unit 21' performs illumination control different from the default illumination control. Here, the control unit 21' according to the present embodiment refers to the attribute table 271 stored in the storage unit 27' to perform illumination control in accordance with an attribute of a user (sender) who has transmitted the illumination pattern. The control unit 21' recognizes the attribute of the sender, based on, for example, an image of the sender captured by the image-capturing unit 28. It is also possible that a user transmits an attribute (such as biological information, a user ID, couple, and family) of the user along with an illumination pattern from the communication terminal 1 to the illumination apparatus 20'. In this case, the reception unit 25 receives the attribute of the sender along with the illumination pattern, and the control unit 21' performs illumination control based on the received attribute.

As explained above, the specific configuration of the illumination apparatus 20' according to the present embodiment has been described in detail. Next, with reference to FIG. 6, an operational process of the illumination apparatus 20' according to the present embodiment will be described.

(2-2-2. Operational Process)

Figure 6:
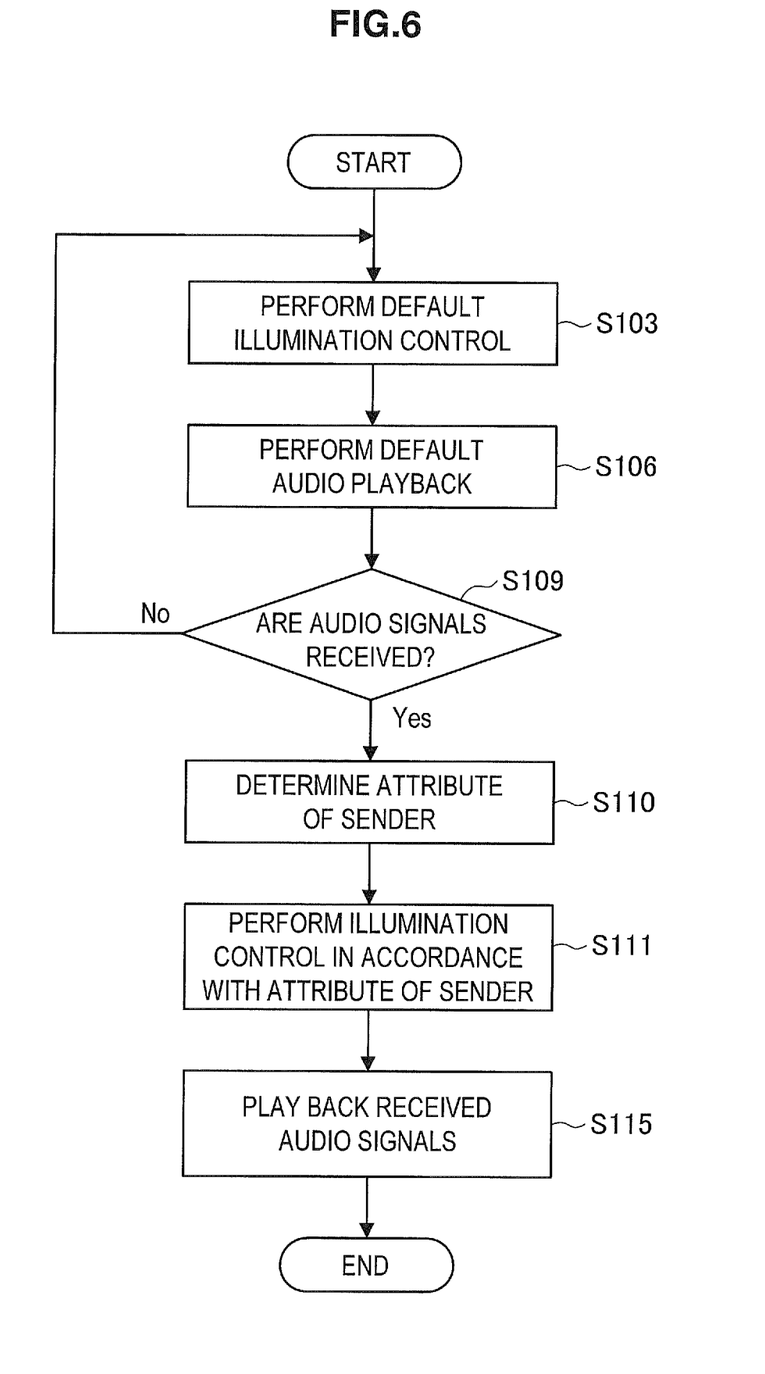
FIG. 6 is a flowchart illustrating an operational process of the illumination apparatus according to the second embodiment.

FIG. 6 is a flowchart illustrating the operational process of the illumination apparatus 20' according to the present embodiment. As illustrated in FIG. 6, first, in step S103 and step S106, the control unit 21' of the illumination apparatus 20' performs the default illumination control and playback control.

Next, in step S109, the control unit 21' determines whether the reception unit 25 has received audio signals from the communication terminal 1 of a user as an illumination pattern.

Next, if the audio signals have been received (S109/Yes), the control unit 21' determines, in step S110, an attribute of the sender. Specifically, the control unit 21' may analyze an image of the sender captured by the image-capturing unit 28 to determine the attribute of the sender, or may use the attribute of the sender received along with the illumination pattern to perform determination.

Next, in step S111, the control unit 21' refers to the attribute table 271 to control illumination of the illumination unit 23 in accordance with the attribute of the sender.

Next, in step S115, the control unit 21' performs control such that the audio signals that the reception unit 25 has received from the communication terminal 1 of the user are played back from the speaker 22. Additionally, step S111 and step S115 may be processed in parallel.

As explained above, the second embodiment has been described in detail. In the second embodiment, if receiving an illumination pattern from the communication terminal 1 of a user, the illumination apparatus 20' according to the present embodiment can control illumination in accordance with an attribute of the user (sender), thereby producing an atmosphere according to the user by using the illumination. Even if the same audio signals are transmitted to the illumination apparatus 20', illumination is different in accordance with an attribute of a user so that the user can feel the illumination is prepared for the user himself/herself and can enjoy the illumination.

2-3. Third Embodiment

In each of the above-described embodiments, a user can enjoy given audio signals that are played back from the illumination apparatuses 20 and 20' each having a speaker built therein at a shop. In such a situation, it is possible that the shop charges a user for the illumination apparatuses 20 and 20'. It will be described in detail below that a user is charged for the illumination apparatus 20 in this way.

(2-3-1. Charging Method)

Various timing and methods for paying a charge for the illumination apparatus 20 can be conceived. For example, the illumination apparatus 20 according to the present embodiment may perform illumination control and playback control as long as the charge for the illumination apparatus 20 has been paid.

Figure 7:
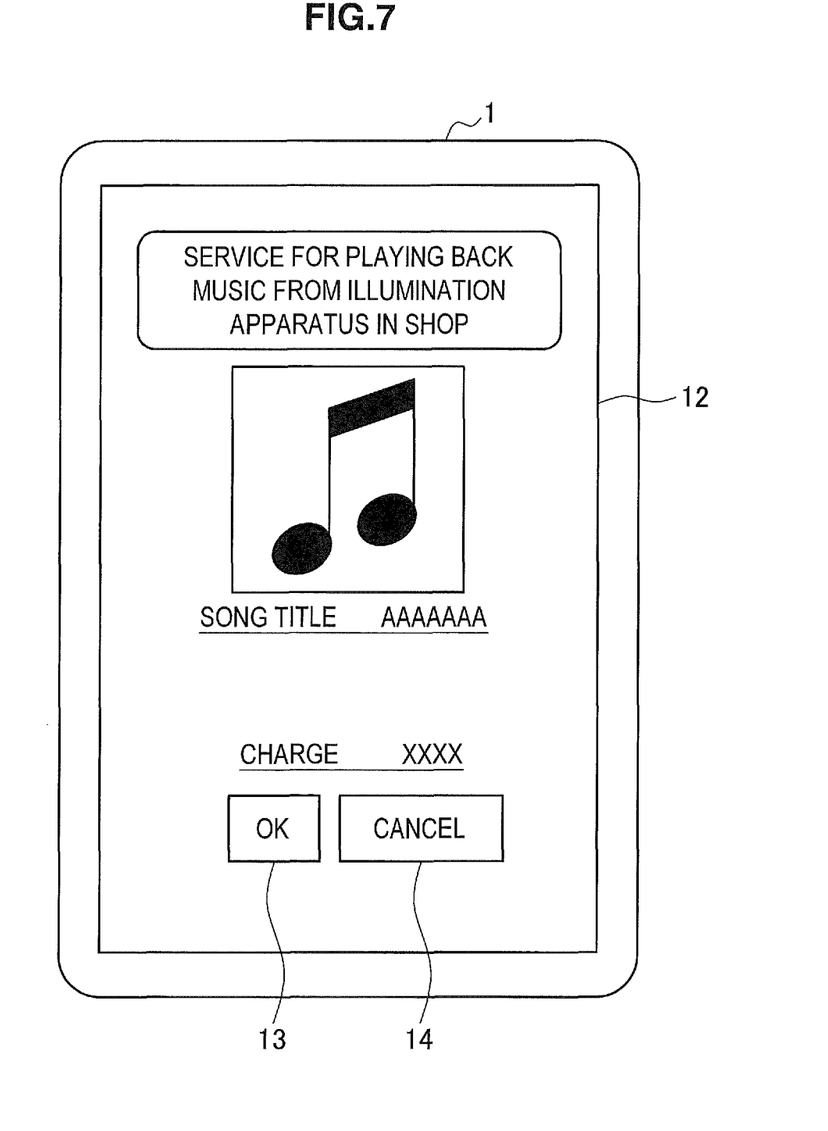
FIG. 7 is a diagram illustrating an example of a charge payment screen displayed on a display of a communication terminal according to a third embodiment.

For example, if a charge payment screen is displayed on the communication terminal 1 and a user accepts the charge payment, audio signals may be transmitted from the communication terminal 1 to the illumination apparatus 20 along with charging information indicating the charge payment. FIG. 7 illustrates an example of the charge payment screen. As illustrated in FIG. 7, a song title indicating audio signals selected by the user, the charge for the illumination apparatus 20, an OK (acceptance) button 13, and a cancel button 14 are displayed on a display 12 of the communication terminal 1.

The user taps on the OK button 13 if accepting the charge for the illumination apparatus 20. The communication terminal 1 then transmits the selected audio signals and the charging information to the illumination apparatus 20. The charge for the illumination apparatus 20 may be paid via, for example, the Internet, or may be added to the monthly charge for the communication terminal 1.

(2-3-2. Operational Process)

Figure 8:
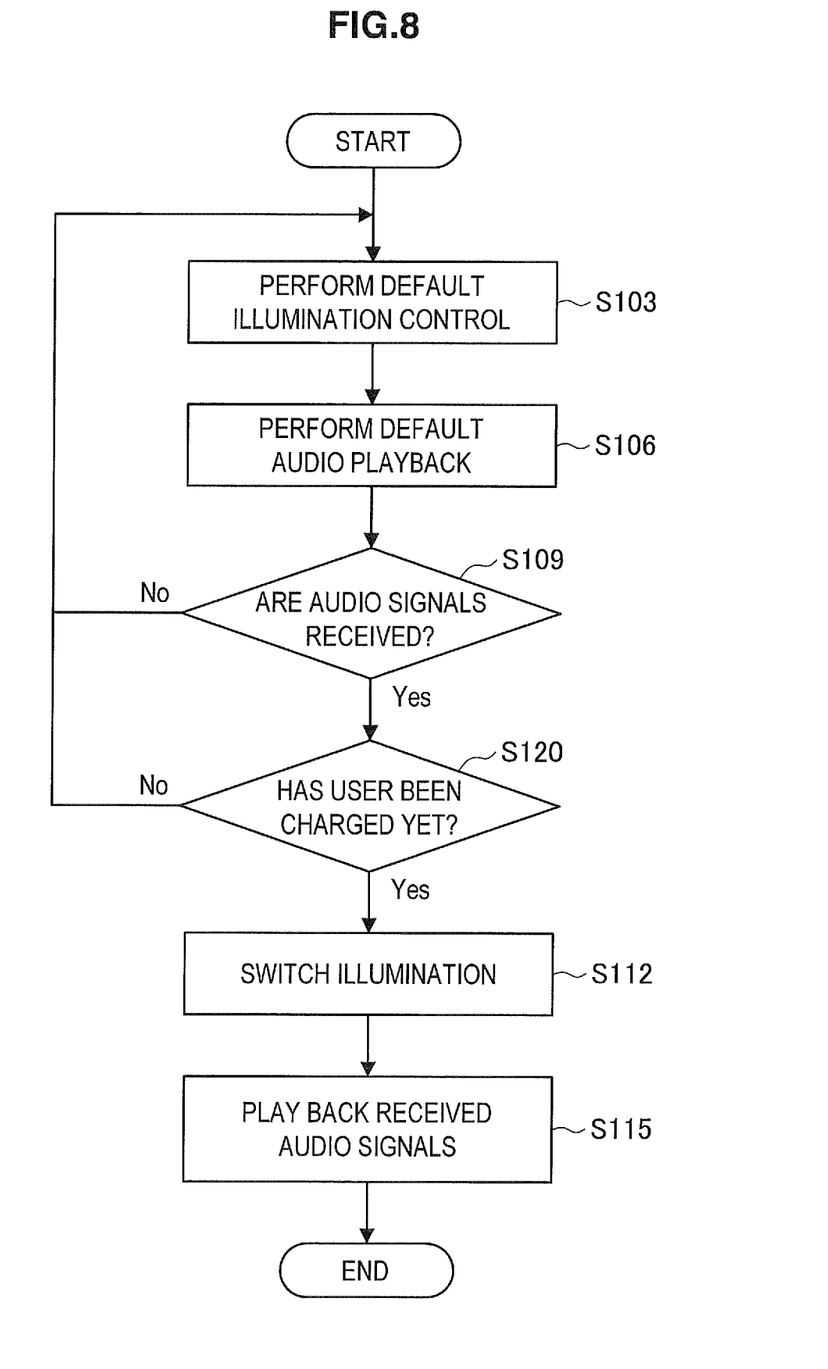
FIG. 8 is a flowchart illustrating an operational process of an illumination apparatus according to the third embodiment.

Next, with reference to FIG. 8, an operational process according to the present embodiment will be described. FIG. 8 is a flowchart illustrating an operational process of an illumination apparatus 20 according to a third embodiment.

As illustrated in FIG. 8, first, in step S103 and step S106, a control unit 21 of the illumination apparatus 20 performs default illumination control and playback control.

Next, in step S109, the control unit 21 determines whether a reception unit 25 has received audio signals from a communication terminal 1 of a user as an illumination pattern.

Next, if the audio signals have been received (S109/Yes), the control unit 21 determines, in step S120, whether the user has been already charged for the illumination apparatus 20 (whether the user has already paid the charge for the illumination apparatus 20). Specifically, if receiving the charging information along with the audio signals from the communication terminal 1, the control unit 21 may determine, based on the charging information, whether the user has been already charged.

Next, if it is determined that the user has been already charged (S120/Yes), the control unit 21 switches, in step S112, illumination of the illumination unit 23 to illumination different from the default illumination.

Next, in step S115, the control unit 21 performs control such that the audio signals that the reception unit 25 has received from the communication terminal 1 of the user are played back from the speaker 22. Additionally, step S112 and step S115 may be processed in parallel.

As explained above, the third embodiment has been described in detail. In the third embodiment, the illumination apparatus 20 according to the present embodiment can perform illumination control and playback control different from the default as long as the charge has been paid.

2-4. Fourth Embodiment

Figure 9:
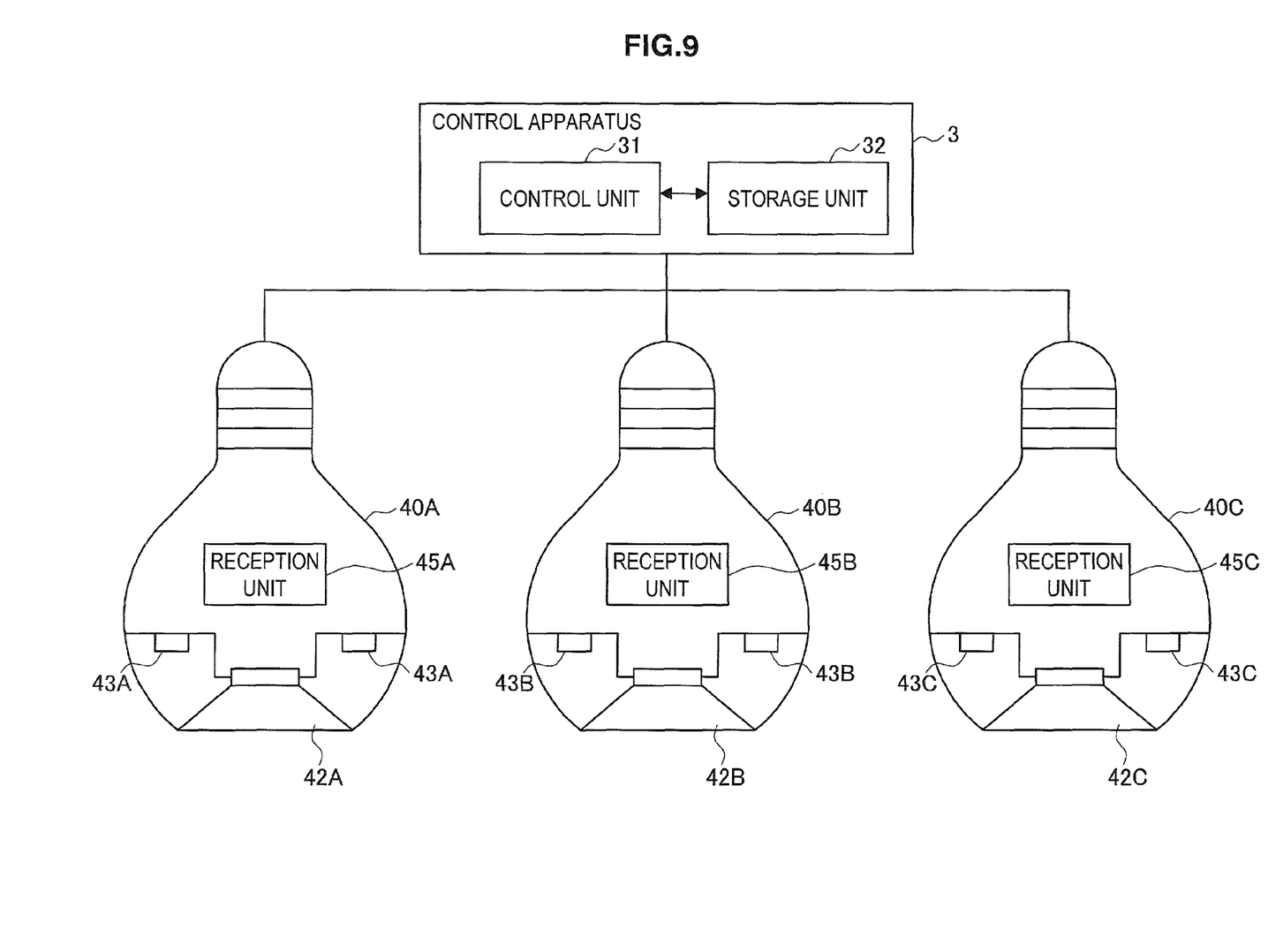
FIG. 9 is a diagram for describing a configuration of a control system according to a fourth embodiment.

In each of the above-described embodiments, it has been described that even if the plurality of illumination apparatuses 20 and 20' is disposed in a shop, the respective illumination apparatuses 20 independently perform illumination control. However, the functions corresponding to the control units 21 and 21' may be configured to be implemented outside the illumination apparatuses 20 and 20' in a control system according to the present embodiment. FIG. 9 will be seen below to make the detailed description.

FIG. 9 is a diagram for describing a configuration of a control system according to a fourth embodiment. As illustrated in FIG. 9, the control system according to the present embodiment includes a plurality of illumination apparatuses 40A, 40B, and 40C, and a control apparatus 3. Additionally, the control system may also include only one illumination apparatus.

The illumination apparatuses 40A, 40B, and 40C are configured to illuminate tables in a shop. The illumination apparatuses will be generically referred to as the illumination apparatus 40 if it is not necessary to separately describe the illumination apparatuses.

As illustrated in FIG. 9, the illumination apparatus 40 according to the present embodiment includes a speaker 42, a plurality of illumination units 43, and a reception unit 45. The speaker 42, the illumination units 43, and the reception unit 45 are configured in the same way as the speaker 22, the illumination unit 23, and the reception unit 25 described in the first embodiment, respectively.

The control apparatus 3 includes a control unit 31 and a storage unit 32. The control unit 31 can individually control the plurality of illumination apparatuses 40A, 40B, and 40C. The control unit 31 has the same function as the function of the control unit 21 or the control unit 21'.

The storage unit 32 stores a default illumination patter, default audio signals, and an attribute table 271 in the same way as the storage unit 27.

The control apparatus 3 hereby performs control on the illumination apparatuses 40A to 40C to first have illumination in accordance with the default illumination pattern. Among the illumination apparatuses 40A to 40C, only an illumination apparatus 40 whose reception unit 35 has received audio signals from a communication terminal of a user is controlled to be switched so as to have illumination different from the default illumination.

In this way, in the control system according to the fourth embodiment, even if the illumination apparatus 40, which is a light bulb having a speaker built therein, does not have a control unit, an external control apparatus can control the illumination apparatus 40 to realize the operational process described in each of the first to third embodiment.

3. CONCLUSION

As explained above, the illumination apparatus (control system) according to the present embodiment can switch illumination control in accordance with reception of an illumination pattern.

More specifically, the illumination apparatus 20 according to the present embodiment, first, performs illumination control in accordance with the default illumination pattern so as to synchronize with another illumination apparatus. When receiving an illumination pattern from the communication terminal 1 of a user, the illumination apparatus 20 is controlled to be switched so as to have illumination different from the default illumination. For example, in a restaurant, when a plurality of illumination apparatuses 20 has default illumination that has been set by the restaurant, a user can hereby switch illumination of some illumination apparatuses 20 around the user.

The illumination apparatus 20 according to the present embodiment is a light bulb having a speaker built therein. When a user transmits given audio signals from the communication terminal 1, the illumination apparatus 20 performs control such that the audio signals are played back from the speaker 22. For example, when predetermined music is played back in a restaurant, the user can hereby transmit audio signals of preference from the communication terminal 1 of the user to an illumination apparatus 20 around the user to enjoy the played back audio signals.

The illumination apparatus 20 according to the present embodiment can also perform illumination control according to an attribute of a user, or illumination control according to received audio signals to produce individual illumination for the user even in a place such as a restaurant that a lot of people use.

It should be understood by those skilled in the art that various modifications, combinations, sub-combinations and alterations may occur depending on design requirements and other factors insofar as they are within the scope of the appended claims or the equivalents thereof.

For example, the communication terminal 1 may transmit signals indicating silence to the illumination apparatus 20. In this case, the illumination apparatus 20 stops playing back default audio signals from the speaker 22. A user can hereby stop BGM of a shop that is played back from the nearby illumination apparatus 20 having a speaker built therein, thereby concentrating on a conversation with a person sitting at the same table.

As described above, the control unit 21 according to the present embodiment may receive sounds of user, image data, and video as an illumination pattern. In this case, the control unit 21 may control illumination of the illumination unit 23 in accordance with a volume and a frequency of the sounds, and a vector of movement in the video.

In the third embodiment, it has been described that the charge payment screen is displayed on the communication terminal 1 of a user, and thereafter, the charge is paid via the Internet, but a method for paying the charge is not limited thereto in the embodiments. For example, the charge may be paid by electronic money on the spot (at the shop), and a communication terminal of the shop may transmit charging information indicating the user has been already charged to the illumination apparatus 20.

The illumination apparatus 20 according to the present embodiment may further perform playback control on audio signals separately from illumination control. Specifically, for example, the illumination apparatus 20 according to the present embodiment may play back audio signals received from the communication terminal 1 of a user and adjust a playback volume in accordance with an instruction received from the communication terminal 1.

Additionally, the present technology may also be configured as below:

(1) An illumination apparatus including:
 an illumination unit;
 a reception unit; and
 a control unit configured to control illumination of the illumination unit in accordance with a default illumination pattern,
 wherein, when the reception unit receives an illumination pattern, the control unit performs illumination control different from the illumination according to the default illumination pattern.
(2) The illumination apparatus according to (1), wherein the illumination control performed on the illumination unit by the control unit in accordance with the default illumination pattern is illumination control substantially synchronized with illumination control performed on another illumination unit.
(3) The illumination apparatus according to (1) or (2), wherein the control unit controls at least switching on and off of illumination, a color of the illumination, or luminous intensity of the illumination in accordance with the illumination pattern received by the reception unit.
(4) The illumination apparatus according to any one of (1) to (3), wherein the default illumination pattern is stored in advance in a predetermined storage medium.
(5) The illumination apparatus according to any one of (1) to (4), further including:
 an audio playback unit,
 wherein the reception unit receives audio signals, and
 wherein the control unit performs control in a manner that the audio signals received by the reception unit are output from the audio playback unit.
(6) The illumination apparatus according to any one of (1) to (5), further including:
 an audio playback unit,
 wherein the reception unit receives audio signals as the illumination pattern, and
 wherein the control unit controls the illumination of the illumination unit in accordance with a pattern of the audio signals received by the reception unit, and performs control in a manner that the audio signals are further output from the audio playback unit.
(7) The illumination apparatus according to (6),
 wherein the reception unit receives charging information along with the audio signals, and
 wherein, when the control unit determines, based on the charging information received by the reception unit, that a charge has been paid, the control unit performs illumination control in accordance with the pattern of the audio signals and performs output control on the audio signals.
(8) The illumination apparatus according to (6) or (7), wherein the illumination apparatus is a light bulb having a speaker built therein.
(9) The illumination apparatus according to any one of (1) to (8), wherein the reception unit receives the illumination pattern from a communication terminal of a user around the illumination apparatus.
(10) The illumination apparatus according to any one of (1) to (8), wherein the reception unit receives the illumination pattern from a communication terminal of a user through near field communication.
(11) The illumination apparatus according to any one of (1) to (10), wherein, when the reception unit receives the illumination pattern, the control unit controls the illumination of the illumination unit in accordance with an attribute of a sender who has transmitted the illumination pattern.
(12) The illumination apparatus according to (11), wherein the reception unit receives the attribute of the sender along with the illumination pattern.
(13) The illumination apparatus according to (11) or (12), wherein the control unit recognizes the attribute of the sender, based on an image obtained by capturing the sender.
(14) The illumination apparatus according to any one of (1) to (13),
 wherein the reception unit receives charging information along with the illumination pattern, and
 wherein, when the control unit determines, based on the charging information received by the reception unit, that a charge has been paid, the control unit performs illumination control in accordance with the illumination pattern.
(15) The illumination apparatus according to any one of (1) to (14),
 wherein the reception unit receives a sound of a user as the illumination pattern, and
 wherein the control unit controls the illumination of the illumination unit in accordance with a pattern of the sound received by the reception unit.
(16) The illumination apparatus according to any one of (1) to (14),
 wherein the reception unit receives image data as the illumination pattern, and wherein the control unit controls the illumination of the illumination unit in accordance with a pattern of the image data received by the reception unit.

(17) A non-transitory computer-readable storage medium having a program stored thereon, the program causing a computer to execute:
- a process of controlling illumination of an illumination unit in accordance with a default illumination pattern;
- a process of receiving, by a reception unit, an illumination pattern; and
- a process of performing illumination control different from the illumination according to the default illumination pattern when the reception unit receives the illumination pattern.

The present disclosure contains subject matter related to that disclosed in Japanese Priority Patent Application JP 2012-197159 filed in the Japan Patent Office on Sep. 7, 2012, the entire content of which is hereby incorporated by reference.

What is claimed is:

1. An illumination apparatus comprising:
   an illumination unit;
   a reception unit; and
   a control unit configured to control illumination of the illumination unit in accordance with a default illumination pattern,
   wherein, when the reception unit receives an illumination pattern, the control unit performs illumination control different from the illumination according to the default illumination pattern.

2. The illumination apparatus according to claim 1, wherein the illumination control performed on the illumination unit by the control unit in accordance with the default illumination pattern is illumination control substantially synchronized with illumination control performed on another illumination unit.

3. The illumination apparatus according to claim 1, wherein the control unit controls at least switching on and off of illumination, a color of the illumination, or luminous intensity of the illumination in accordance with the illumination pattern received by the reception unit.

4. The illumination apparatus according to claim 1, wherein the default illumination pattern is stored in advance in a predetermined storage medium.

5. The illumination apparatus according to claim 1, further comprising:
   an audio playback unit,
   wherein the reception unit receives audio signals, and
   wherein the control unit performs control in a manner that the audio signals received by the reception unit are output from the audio playback unit.

6. The illumination apparatus according to claim 1, further comprising:
   an audio playback unit,
   wherein the reception unit receives audio signals as the illumination pattern, and
   wherein the control unit controls the illumination of the illumination unit in accordance with a pattern of the audio signals received by the reception unit, and performs control in a manner that the audio signals are further output from the audio playback unit.

7. The illumination apparatus according to claim 6,
   wherein the reception unit receives charging information along with the audio signals, and
   wherein, when the control unit determines, based on the charging information received by the reception unit, that a charge has been paid, the control unit performs illumination control in accordance with the pattern of the audio signals and performs output control on the audio signals.

8. The illumination apparatus according to claim 6, wherein the illumination apparatus is a light bulb having a speaker built therein.

9. The illumination apparatus according to claim 1, wherein the reception unit receives the illumination pattern from a communication terminal of a user around the illumination apparatus.

10. The illumination apparatus according to claim 1, wherein the reception unit receives the illumination pattern from a communication terminal of a user through near field communication.

11. The illumination apparatus according to claim 1, wherein, when the reception unit receives the illumination pattern, the control unit controls the illumination of the illumination unit in accordance with an attribute of a sender who has transmitted the illumination pattern.

12. The illumination apparatus according to claim 11, wherein the reception unit receives the attribute of the sender along with the illumination pattern.

13. The illumination apparatus according to claim 11, wherein the control unit recognizes the attribute of the sender, based on an image obtained by capturing the sender.

14. The illumination apparatus according to claim 1,
   wherein the reception unit receives charging information along with the illumination pattern, and
   wherein, when the control unit determines, based on the charging information received by the reception unit, that a charge has been paid, the control unit performs illumination control in accordance with the illumination pattern.

15. The illumination apparatus according to claim 1,
   wherein the reception unit receives a sound of a user as the illumination pattern, and
   wherein the control unit controls the illumination of the illumination unit in accordance with a pattern of the sound received by the reception unit.

16. The illumination apparatus according to claim 1,
   wherein the reception unit receives image data as the illumination pattern, and
   wherein the control unit controls the illumination of the illumination unit in accordance with a pattern of the image data received by the reception unit.

17. A non-transitory computer-readable storage medium having a program stored thereon, the program causing a computer to execute:
   a process of controlling illumination of an illumination unit in accordance with a default illumination pattern;
   a process of receiving, by a reception unit, an illumination pattern; and
   a process of performing illumination control different from the illumination according to the default illumination pattern when the reception unit receives the illumination pattern.

* * * * *